United States Patent [19]
Ngo

[11] Patent Number: 5,990,487
[45] Date of Patent: Nov. 23, 1999

[54] STAGE PLUNGER MECHANISM FOR STORAGE PHOSPHOR READER

[75] Inventor: Giang T. Ngo, Hilton, N.Y.

[73] Assignee: Eastman Kodak Company, Rochester, N.Y.

[21] Appl. No.: 08/935,707

[22] Filed: Sep. 23, 1997

[51] Int. Cl.$^6$ ............................ G03B 42/02; G03B 42/04
[52] U.S. Cl. ......................................................... 250/589
[58] Field of Search ................................... 250/581, 584, 250/588, 589, 909; 378/182, 208; 206/387.12

[56] References Cited

U.S. PATENT DOCUMENTS

| | | | |
|---|---|---|---|
| 4,186,308 | 1/1980 | Erikson | 378/183 |
| 4,965,455 | 10/1990 | Schneider et al. | 250/484.4 |
| 5,277,322 | 1/1994 | Boutet et al. | 211/40 |
| 5,330,309 | 7/1994 | Brahm et al. | 414/411 |

*Primary Examiner*—Constantine Hannaher
*Assistant Examiner*—Albert Gagliardi
*Attorney, Agent, or Firm*—William F. Noval

[57] ABSTRACT

A storage phosphor reader which has a stage for moving a storage phosphor in a first direction past a reading station; a storage phosphor extraction assembly mounted on the stage for extracting a storage phosphor from a stationary cassette and for moving the storage phosphor onto and off the stage in second opposite directions perpendicular to the first opposite directions; a plunger assembly mounted on the stage for supporting a storage phosphor during movement of the stage in the first direction, the plunger assembly being movable between an extended position to support a storage phosphor and a retracted position out of contact with a storage phosphor; and a cam and cam follower for moving the plunger assembly from the retracted position to the extended position when the extraction assembly has completely extracted a storage phosphor from the cassette and moved the storage phosphor onto the stage and for moving the plunger assembly from the extended position to the retracted position when the storage phosphor is being moved onto or off of the stage.

4 Claims, 6 Drawing Sheets

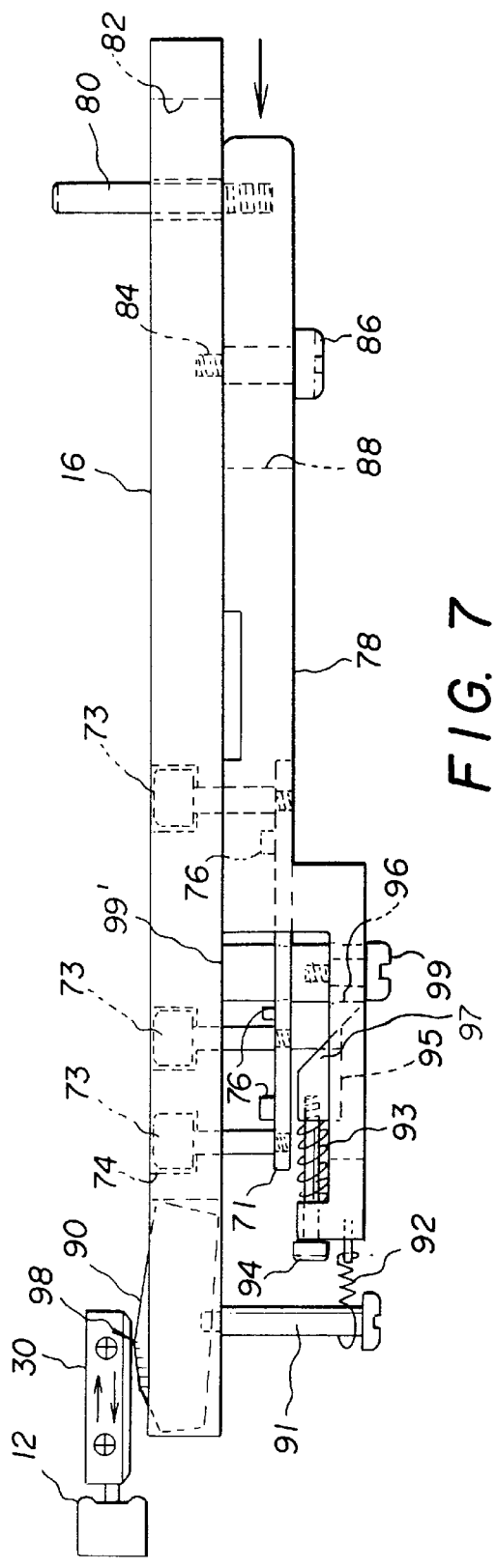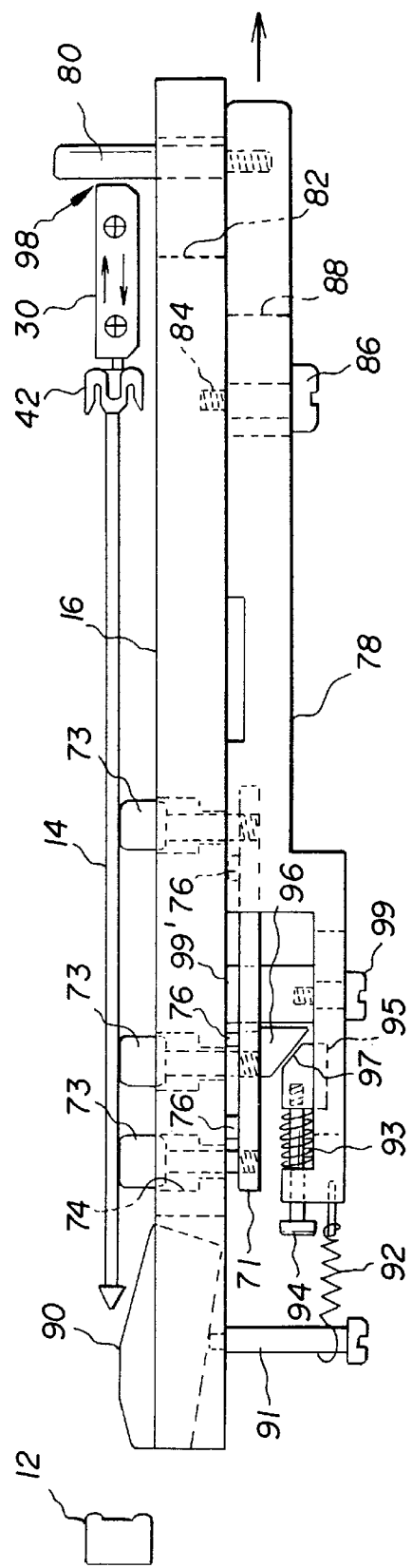

STAGE PLUNGER MECHANISM FOR STORAGE PHOSPHOR READER

FIELD OF THE INVENTION

This invention relates in general to storage phosphor readers and more particularly to a stage plunger mechanism for a storage phosphor reader.

BACKGROUND OF THE INVENTION

In a known storage phosphor reader, a cassette containing a storage phosphor is located at a cassette receiving station where the cassette is clamped to the reader. A storage phosphor extraction mechanism extracts the storage phosphor from the cassette and moves the storage phosphor onto a stage. The stage moves the storage phosphor past a laser scanning reading station where the latent radiographic image stored in the phosphor is converted to a radiographic image signal.

An extraction mechanism used in such reader includes a hook bar assembly and a locating pin (See: U.S. Pat. No. 5,330,309, issued Jul. 19, 1994, inventors Brahm et al). The assembly is initially moved so that the locating pin contacts the front end of the storage phosphor. The assembly is then moved laterally of the cassette until the locating pin falls into a reference opening in the front end of the storage phosphor. The extractor assembly is then moved relative to the cassette to engage the hook bar assembly with the storage phosphor to unlatch the storage phosphor and to subsequently remove the storage phosphor from the cassette onto a stage. Rollers mounted on the stage support the storage phosphor during loading and unloading and during reading. These rollers have been known to interfere with the extraction and insertion process. Moreover, vibration of rollers and supported storage phosphor can occur.

SUMMARY OF THE INVENTION

According to the present invention there is provided an improvement over the apparatus described above. According to a feature of the present invention there is provided a storage phosphor reader comprising: a stage for moving a storage phosphor in a first direction past a reading station; a storage phosphor extraction assembly mounted on the stage for extracting a storage phosphor from a stationary cassette and for moving the storage phosphor onto and off the stage in second opposite directions perpendicular to the first opposite directions; a plunger assembly mounted on the stage for supporting a storage phosphor during movement of the stage in the first direction, the plunger assembly being movable between an extended position to support a storage phosphor and a retracted position out of contact with a storage phosphor; and means for moving the plunger assembly from the retracted position to the extended position when the extraction assembly has completely extracted a storage phosphor from the cassette and moved the storage phosphor onto the stage and for moving the plunger assembly from the extended position to the retracted position when the storage phosphor is being moved onto or off of the stage.

ADVANTAGEOUS EFFECT OF THE INVENTION

The present invention has the following advantages.

1. It is simple, robust, reliable, and efficient.

2. There is no mechanical interference during storage phosphor extraction and insertion process.

3. Wear, vibrations, and other mechanical problems are eliminated.

BRIEF DESCRIPTION OF THE DRAWINGS

FIGS. 7 and 8 are diagrammatic elevational views of a stage plunger mechanism.

DETAILED DESCRIPTION OF THE INVENTION

Figure 1:
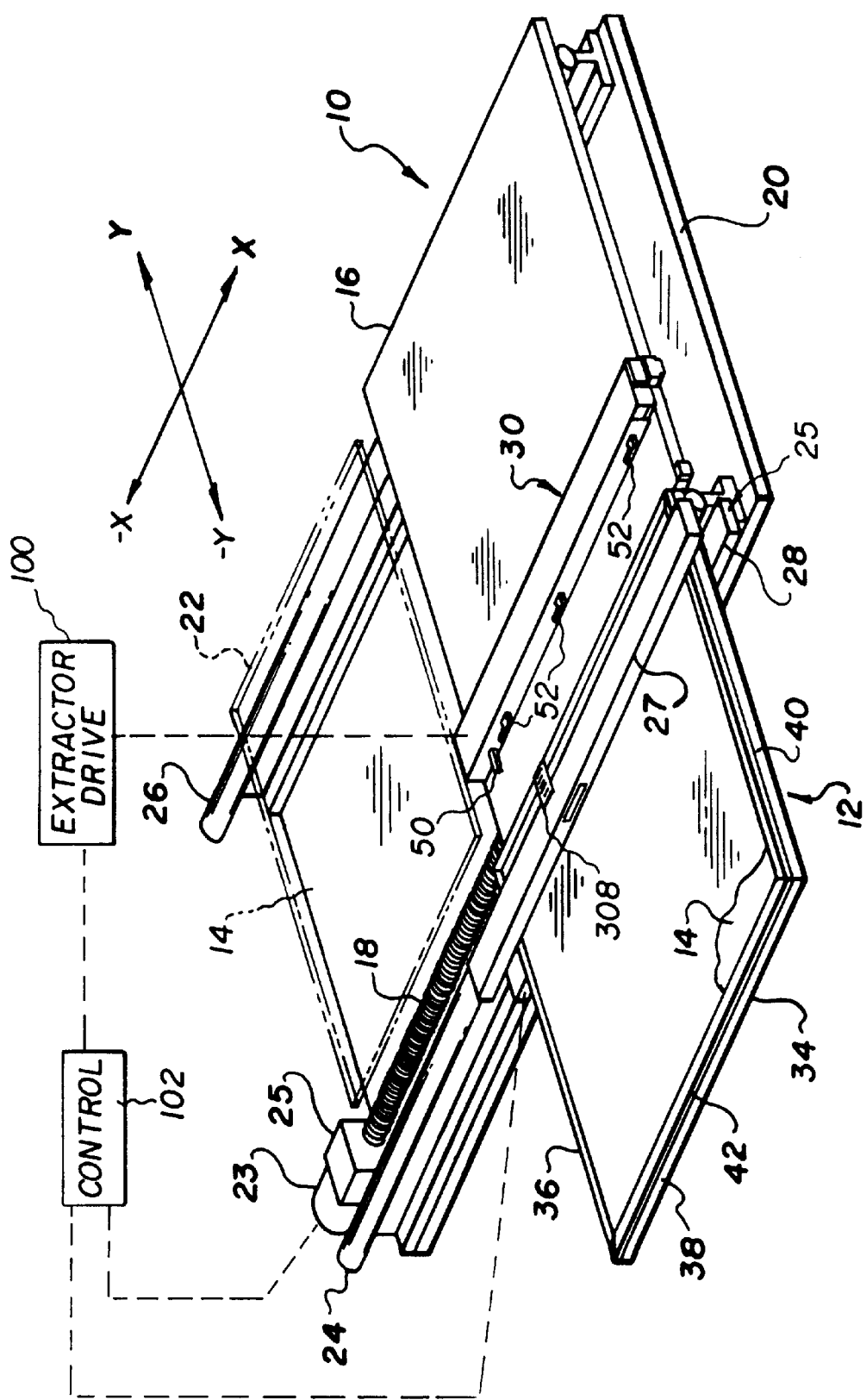
FIG. 1 is a perspective view of components of a storage phosphor reader incorporating the present invention.
Figure 2:
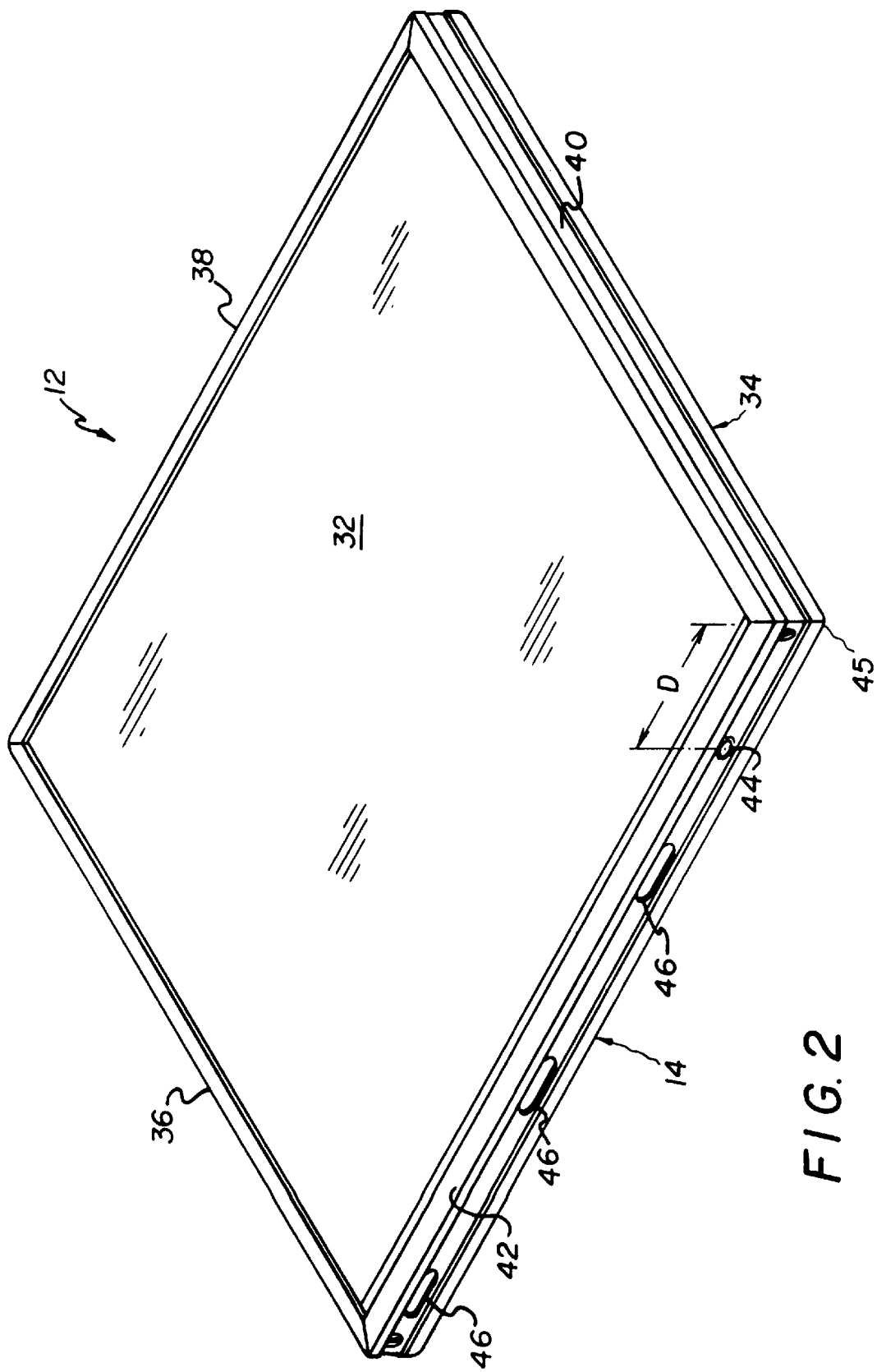
FIGS. 2 and 3 are perspective views of storage phosphor cassettes which can be read by reader 10.

Referring to FIGS. 1–2, there is illustrated a storage phosphor reader 10 including components for scanning a storage phosphor. In the particular embodiment illustrated, the reader 10 is designed to receive a cassette 12 having a storage phosphor 14 disposed therein. Storage phosphor 14 is capable of storing a latent image upon x-radiation of a body part. A digital image can be extracted for later viewing or development of a x-ray film by reading the latent x-ray image with a laser scanning reader. The reader is of the raster scanner-type. Briefly, when the image on the storage phosphor 14 is exposed to a stimulating ray beam, such as a laser beam, the storage phosphor 14 emits a light in proportion to a stored x-radiation energy. The light thus emitted is photoelectrically detected and converted to an electrical signal, and the radiation image of the object is reproduced visually by exposure of the image signal on a recording medium such as a photographic film or on a video monitor.

The stimulating of the storage phosphor by a laser beam is typically done using a raster scanning technique. The mechanism 10 includes a movable stage 16 which includes a drive screw 18 which is mounted to base 20 of the reader. The drive screw 18 is in threaded engagement with movable stage 16 so as to move the stage 16 from the receiving position illustrated in FIG. 1 to the scanned position 22 illustrated by dash lines also in FIG. 1. An appropriate stepper motor 23 and corresponding transmission 25 is provided for rotating the drive screw 18 such that the stage 16 can move in the X direction. The stage 16 is supported by a pair of guide rails 24,26 which are axially spaced apart and secured to the base 20. Guide rails 24,26 and drive screw 18 are in substantial parallel alignment with each other.

The reader includes a cassette clamping mechanism at cassette receiving station 25. The clamping mechanism includes an upper clamp jaw 27 and lower clamp jaw 28 which are used to clamp the cassette in a predetermined fixed position.

The mechanism 10 includes an extractor bar assembly 30 which is mounted to stage 16 for movement in the Y direction by extractor drive 100. The X and Y directions, as set forth in this application, have been provided merely for the sake of clarity in describing the direction of movement of various parts, it being understood that any coordinate system may be substituted as desired. In the particular embodiment, the extractor bar assembly 30 is designed for movement to and away from the cassette 12, while the stage 16 moves in a direction substantially transverse to the end/side of the cassette facing the extractor bar assembly 30. The cassette 12 is of the type designed for removing the storage phosphor from the end/side of the cassette. Briefly, as shown in FIG. 2, the cassette 12 comprises a shell having upper and lower panels 32,34, respectively, and three side caps 36,38,40. A storage phosphor 14 is disposed therein and is secured to a removable end cap 42. The end cap 42 includes a latching mechanism for releasing the end cap 42 from the cassette 12. Additionally, the end cap 42 includes an alignment opening 44, disposed preferably along one side of the cassette 12. The end cap 42 further includes a plurality of access openings 46 designed to receive hook members designed to engage the latching mechanism disposed within the cassette (not shown). The latching mechanism is of a construction such that when the hook mechanism is moved in a particular direction, it will release the end cap 42 from the cassette 12 allowing the end cap 42 and attached storage phosphor 14 to be removed therefrom.

Figure 3:
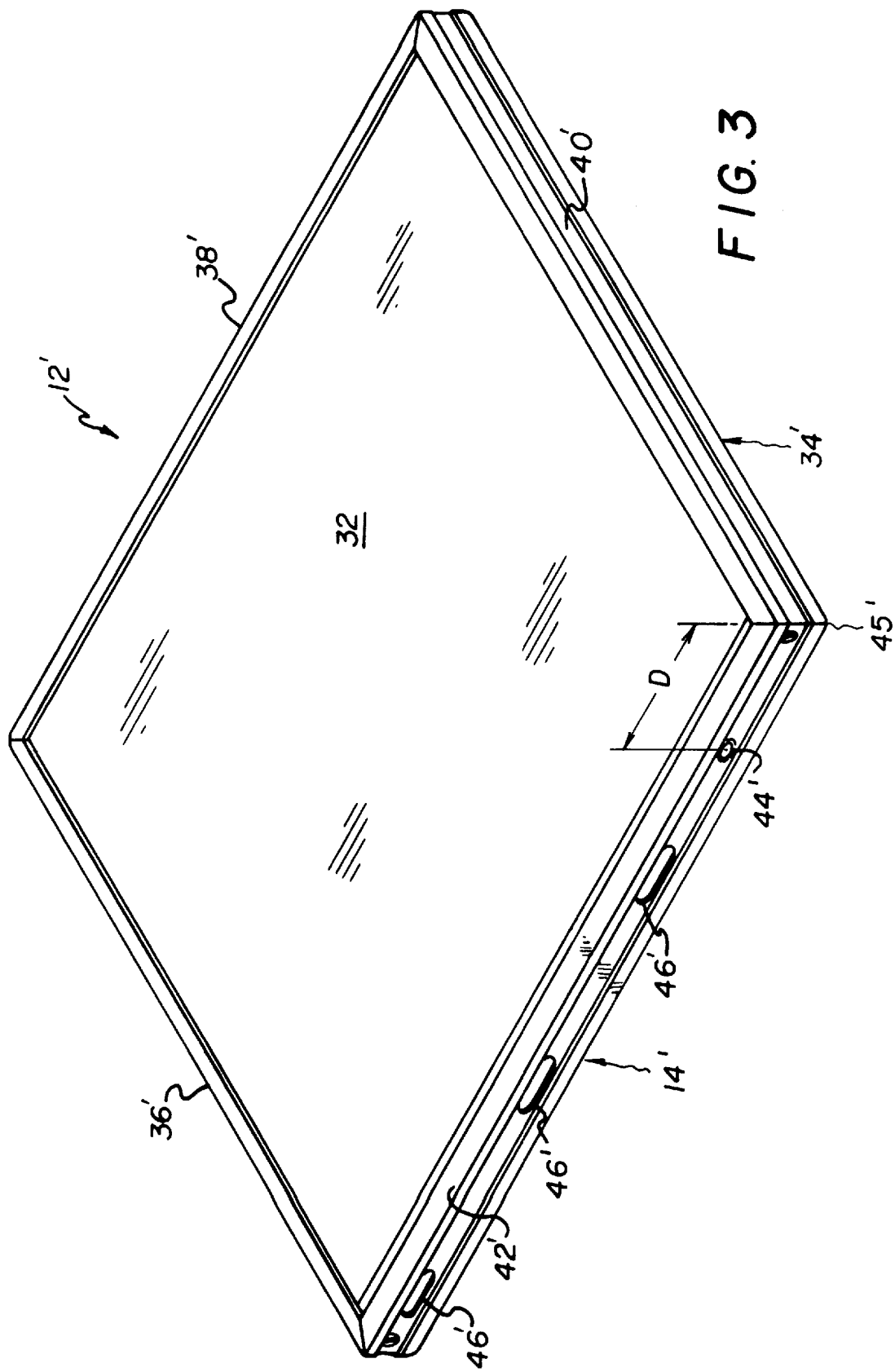

FIG. 3 shows a different sized cassette 12' having a shell with upper and lower panels 32',34', respectively, and three side caps 36',38',40'. Removable storage phosphor 14' is disposed therein and is secured to an end cap 42'. End cap 42' has alignment opening 44' and access openings 46'. Cassette 12' is preferably held in a pallet such as disclosed in U.S. Pat. No. 5,277,322 to facilitate handling of the cassette.

Cassette 12 contains a larger storage phosphor 14 than the storage phosphor 14' of cassette 12'. For example, storage phosphor 14 has the dimensions 35 cm×43 cm and storage phosphor 14' has the dimensions 20 cm×25 cm.

Figure 5:
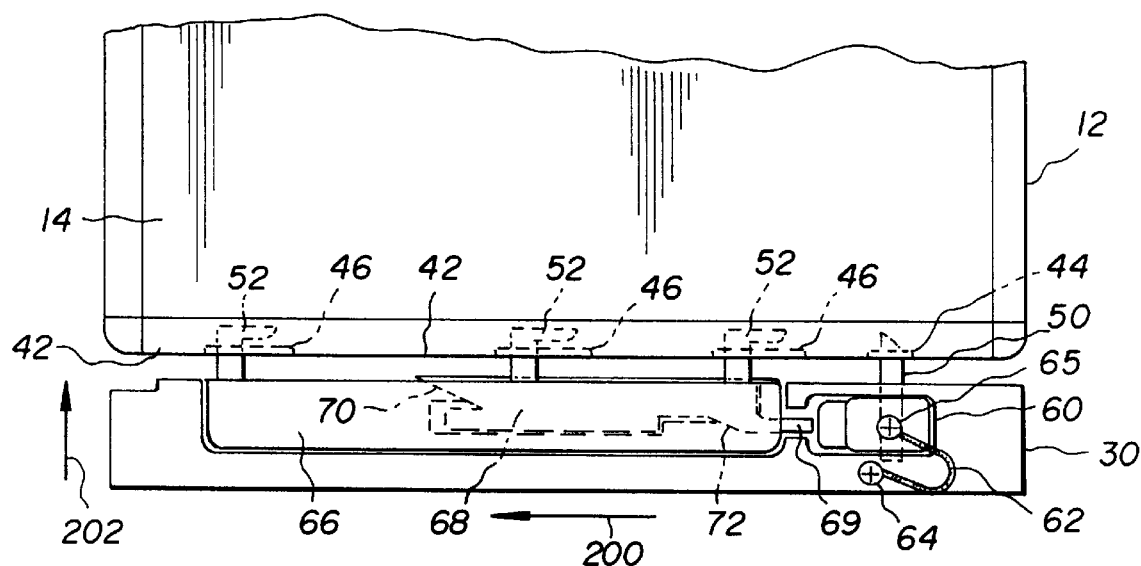
FIGS. 5 and 6 are diagrammatic plan views of a storage phosphor extraction mechanism.
Figure 6:
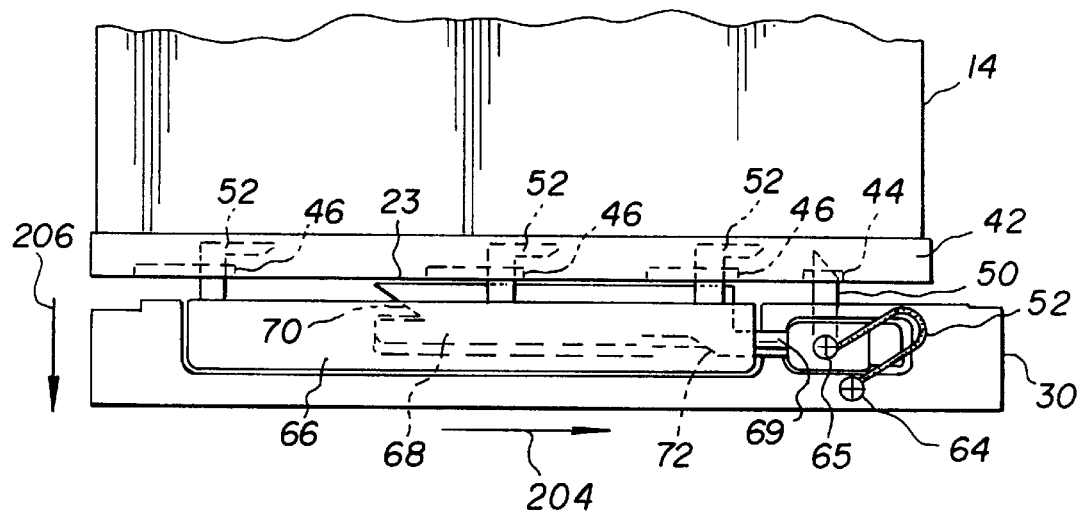

Referring now to FIGS. 5 and 6, there is shown in greater detail extractor bar assembly 30. As shown, extractor bar assembly 30 includes a locator pin 50 and hook members 52. Pin 50 is adapted to enter alignment opening 44 in storage phosphor 14 and hook members 52 are adapted to enter access openings 46 in storage phosphor 14. Pin 50 is fixedly mounted on slider 60. An over center spring 62 is connected by fastener 64 to assembly 30 and by fastener 65 to slider 60. Hook members 52 are mounted on hook plate 66. A wedge mechanism 68 includes a pin 69 which is engageable by slider 60.

Extractor bar assembly 30 mounted on stage 16 is driven in the direction of arrow 202 by extractor drive 100 (FIG. 1) on stage 16 and in the direction of arrow 200 by stage 16, motor 23 and transmission 25 to insert locator pin 50 into alignment opening 44 and hook members 52 into access openings 46. The direction of stage 16 is reversed to move assembly 30 in the direction of arrow 204 (FIG. 6). Slider 60 engages pin 69 which urges wedge mechanism 68 forward into contact with end cap 42 of storage phosphor 14 by means of camming surfaces 70,72. Over center spring 62 locks hook members 52 in engagement with storage phosphor 14. Extraction bar assembly 30 is then moved by drive 100 in the direction of arrow 206 to completely remove storage phosphor 14 from cassette 12.

This process is reversed to insert storage phosphor 14 back into cassette 12.

Wedge mechanism 68 holds end cap 42 rigid relative to storage phosphor 14 so that wear of pin 44, hooks 52, and end cap 42 is minimized during extraction and insertion of storage phosphor 14.

The distance D between alignment opening 44 in end cap 42 of storage phosphor 14 and reference corner 45 is greater than the distance D' between alignment opening 44' in end cap 42' of storage phosphor 14' and reference corner 45' (See: FIGS. 2 and 3). Thus, some technique must be used to align pin 50 of assembly 30 with opening 44 of storage phosphor 14 to avoid the disadvantages of the alignment mechanism of U.S. Pat. No. 5,330,309.

Figure 4:
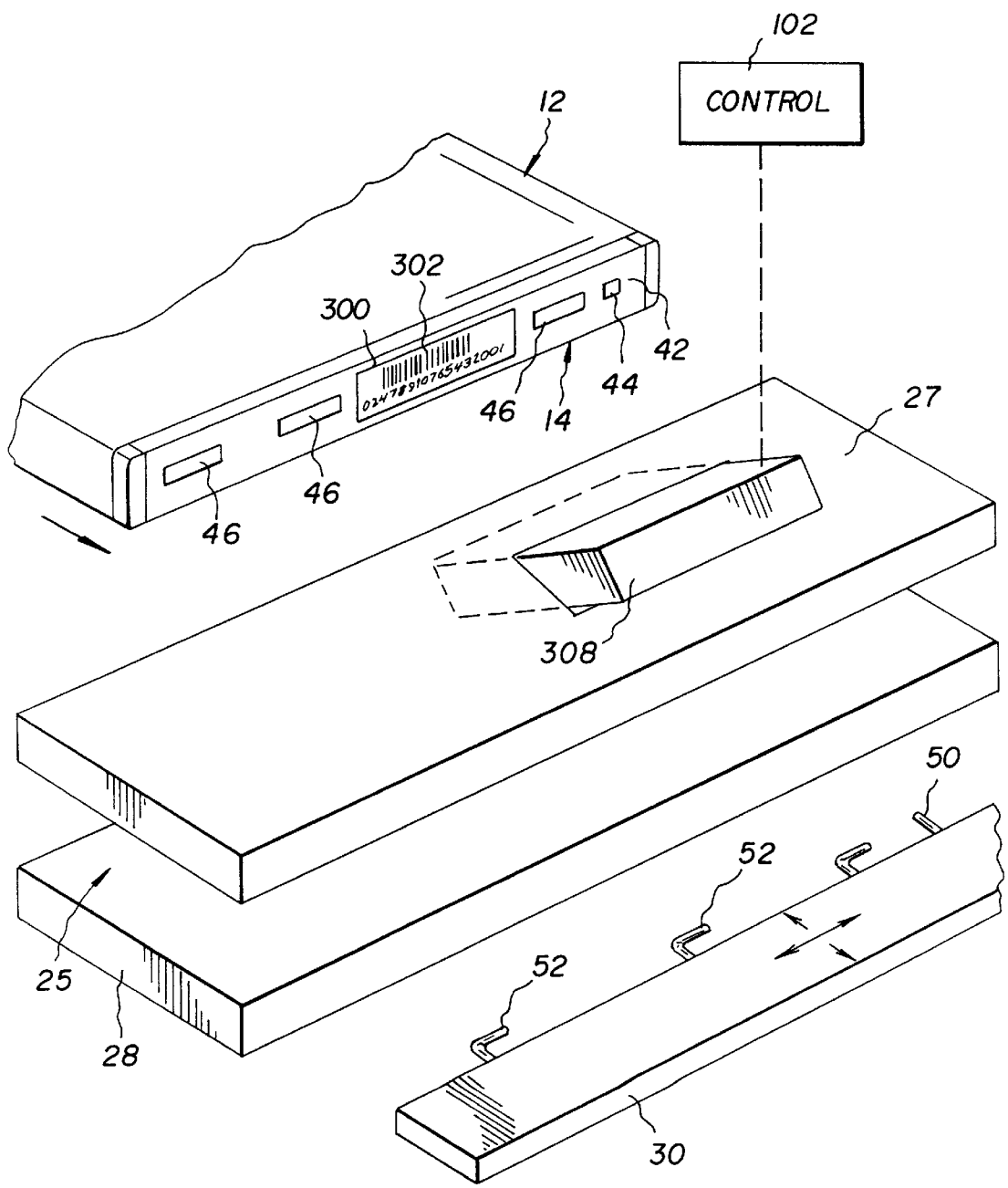
FIG. 4 is a diagrammatic view of a bar code system for aligning the storage phosphor extraction mechanism.

As shown in FIG. 4, end cap 42 of storage phosphor 14 is provided with a bar code label 300. Label 300 includes a bar code 302 encoding various data including storage phosphor ID number, storage phosphor dimensional size (e.g., 35 cm×43 cm), and speed (of screen). Mounted on upper clamp jaw 27 is a bar code reader 308 of a known type. Before cassette 12 is clamped between clamp jaws 27,28 at cassette receiving station 25, bar code reader 308 reads the bar code 302 including storage phosphor dimensional size data. This data is transmitted to control 102 (such as a microprocessor system). Control 102 uses the storage phosphor dimensional data to control extractor drive 100 and stage drive motor 23 to position extraction bar assembly 30 so that pin 50 is exactly aligned with alignment opening 44 in end cap 42. This bar code alignment system eliminates the pin switch system of U.S. Pat. No. 5,330,309, thus increasing reliability, minimizing reader down time, and eliminating damage to the cassette caused by the locating pin striking the cassette.

Referring now to FIGS. 7 and 8, there is shown a stage plunger mechanism incorporated in a storage phosphor reader. As shown, stage 16 mounts a plunger member 71 supporting a plurality of plungers 73 which are recessed in plunger recesses 74 in stage 16. Member 71 has fixed stops 76.

A plunger actuating member 78 is provided to move plungers 73 on plunger member 71 from the recessed position shown in FIG. 7 to the extended position shown in FIG. 8. Member 78 has a pin 80 projecting through slot 82 in stage 16. Screw 84 with head 86 projects through slot 88 in member 78 and holds member 78 in sliding engagement with stage 16. Screw 84 also limits the range of relative movement between stage 16 and member 78.

A flexible inclined support 90 is also mounted on stage 16. Support 90 bears against screw 91 fixed on stage 16. A spring 92 extends between screw 91 and member 78. Member 78 supports a cam 95 biased by spring 93 threaded on screw 94. Plunger member 71 has a cam follower 96 with camming surface 97.

In operation, as shown in FIG. 7, extractor bar assembly 30 is in a position to extract a storage phosphor 14 from cassette 12. Support 90 is depressed by assembly 30 at contact region 98. Spring 92 biases member 78 to the left and plungers 73 are recessed to permit loading of storage phosphor 14 onto stage 16 without interference therewith.

As shown in FIG. 8, extraction bar assembly 30 has loaded storage phosphor 14 onto stage 16. Extraction bar assembly 30 has engaged pin 80 at 98 to move pin 80 to the right in slot 82. Member 78 is also moved to the right causing cam 95 to move cam follower 96 via camming surface 97. Plunger member 71 is moved upwardly to move plungers 73 from their recessed position of FIG. 7 to their extended position of FIG. 8 in supporting contact with storage phosphor 14. The upward movement of member 78 is limited by stops 76. Member 99' mounted by screw 99 is also moved upwardly. The stage 16 now moves storage phosphor 16 through a reading and erase cycle.

When storage phosphor 14 is replaced in cassette 12, extraction bar assembly 30 moves to the left and disengages from pin 80. Spring 92 slides member 78 to the left withdrawing cam 95 from active engagement with cam follower 96. The plunger member 71 moves downwardly moving plungers 73 into the recessed position of FIG. 7. The plungers 73 are recessed during movement of storage phosphor 14 to the left, thus eliminating possible damage to storage phosphor 14 caused by sliding contact with the plungers 73.

The invention has been described in detail with particular reference to certain preferred embodiments thereof, but it will be understood that variations and modifications can be effected within the spirit and scope of the invention.

PARTS LIST 10 reader
12,12' cassettes
14,14' storage phosphors
16 movable stage
18 drive screw
20 base
22 scanned position
23 stepper motor
24,26 guide rails
25 cassette receiving station
27,28 clamp jaw
30 extractor bar assembly
32,32' upper panel
34,34' lower panel
36,36',38,38',40,40' side caps
42,42' end caps
44,44' alignment openings
45,45' reference corners
46,46' access openings
50 locator pin
52 hook members
60 slider
62 over center spring
64,65 fasteners
66 hook plate
68 wedge mechanism
69 pin
70,72 camming surfaces
71,73 plunger members
74 plunger recesses
76 fixed stops
78 member
80 pin
82 slot
84 screw
86 head
88 slot
90 flexible inclined support
91 screw
92,93 springs
94 screw
95 cam
96 cam follower
97 camming surface
98 contact region
99 screw
99' member
100 extractor drive
102 control
300 bar code label
302 barcode
308 bar code reader

What is claimed is:

1. A storage phosphor reader comprising:

a stage for moving a storage phosphor in a first direction past a reading station;

a storage phosphor extraction assembly mounted on said stage for extracting a storage phosphor from a stationary cassette and for moving said storage phosphor onto and off said stage in second opposite directions perpendicular to said first direction;

a plunger mechanism mounted on said stage for supporting a storage phosphor during movement of said stage in said first direction, said plunger mechanism being movable between an extended position to support a storage phosphor and a recessed position out of contact with a storage phosphor; and means for moving said plunger mechanism from said recessed position to said extended position when said extraction assembly has completely extracted a storage phosphor from said cassette and moved said storage phosphor onto said stage and for moving said plunger mechanism from said extended position to said recessed position when said storage phosphor is being moved onto or off of said stage.

2. The reader of claim 1 wherein said plunger mechanism includes a plunger member supporting a plurality of plungers which are recessed in plunger recesses in said stage when in said recessed position.

3. The reader of claim 2 wherein said moving means includes a plunger actuating member operatively linked to said plunger member, said plunger actuating member having a pin which is engaged by said extraction assembly when said storage phosphor has been completely moved onto said stage, so as to move said plunger member to an extended position with said plungers supporting said storage phosphor.

4. The reader of claim 3 wherein said plunger actuating member is linked to said plunger member by a cam and cam follower arrangement.

* * * * *